United States Patent [19]
Hendrix

[11] Patent Number: 5,680,197
[45] Date of Patent: Oct. 21, 1997

US005680197A

[54] METHOD OF PRODUCING COMPOSITE PHOTOGRAPHS

[76] Inventor: Song In Hendrix, c/o 4250 Wilshire Blv. Second Fl., Los Angeles, Calif. 90070

[21] Appl. No.: 523,006

[22] Filed: Sep. 1, 1995

[51] Int. Cl.$^6$ .................................................. G03B 11/00
[52] U.S. Cl. .................................................. 354/122; 354/295
[58] Field of Search .................................. 354/122, 295, 354/291

[56] References Cited

U.S. PATENT DOCUMENTS

| | | | |
|---|---|---|---|
| 1,543,065 | 6/1925 | Douglass | 354/125 |
| 1,813,436 | 7/1931 | Bhosys | 354/120 |
| 1,863,826 | 6/1932 | Briel | 430/394 |
| 2,025,327 | 12/1935 | Briel | 430/394 |
| 3,135,184 | 6/1964 | Siedbenberg | 354/122 |
| 3,765,314 | 10/1973 | Horvath et al. | 354/122 |
| 4,122,470 | 10/1978 | Loranger et al. | 354/122 |
| 4,165,163 | 8/1979 | Lemanski | 354/122 |
| 4,291,962 | 9/1981 | Jackson | 354/122 |
| 4,484,805 | 11/1984 | Gizzio | 354/122 |
| 4,506,964 | 3/1985 | Hayles | 354/122 |

*Primary Examiner*—A. A. Mathews
*Attorney, Agent, or Firm*—Erik M. Arnhem

[57] ABSTRACT

A composite photograph can be produced by taking two or more pictures, with different areas of the camera lens masked or covered during each picture-taking event. The mask structure is adjusted or repositioned between the picture-taking events so that when the multiple pictures are printed on a common film positive the composite picture will be a combination or merging of the scenes taken in the individual pictures. The mask structure can take the form of two or more rotary mask elements slidably carried on a cap structure adapted for placement on the front end of a conventional camera. Preferably the camera is an instant camera having self-contained mechanisms for printing the exposed picture on a film positive.

1 Claim, 1 Drawing Sheet

METHOD OF PRODUCING COMPOSITE PHOTOGRAPHS

BACKGROUND AND SUMMARY OF THE INVENTION

This invention relates to a method of producing composite photographs, e.g. photographs obtained by double exposure in selected zones on a predetermined area of a photographic film. The invention is preferably practiced with an instant camera having self-contained means for printing the exposed picture on a film positive.

It is known that composite pictures can be produced on a strip of film. U.S. Pat. No. 1,543,065 to L. F. Douglass, discloses a photographic method that includes selective positionment of mask elements on a clear glass panel located within a camera between the camera lens and the negative film strip. In practicing the method the camera is actuated a first time with one mask element in place the glass panel, thereby exposing a portion of the film not covered by the mask element. The camera is actuated a second time with a different mask element in place the glass panel, thereby exposing a different portion of the film strip. The mask elements have complementary shapes so that a composite photograph containing two scenes is obtained.

One problem with the method of U.S. Pat. No. 1,543,065 is that presumably the glass panel would have to be removed from the camera interior space in order to change the mask elements. It is believed that such an operation would have to be carried out in a darkroom, in order to prevent inadvertent exposure of the film strip while the camera was in an opened condition. Also, the mask elements would have to be placed in relatively precise positions on the glass panel in order to achieve a composite photograph devoid of noticeable demarcation lines or spaces.

U.S. Pat. No. 1,813,436 to C. Bhosys discloses a photographic method wherein successive multiple photographs are taken of a person in different poses or positions. Each photograph is taken against a non-actinic (non reactive) background so that the person's image appears in each photograph. The person is placed different distances from the camera for each photograph so that overlapping areas of the image are exposed to different shades or degrees. The method would seem to require some trial-and-error practice in order to achieve desired results consistently.

U.S. Pat. No. 2,025,327, to C. Briel, discloses a method of producing a composite photograph, wherein the camera is targeted onto one photograph containing the foreground scene and a second photograph containing the background scene. The camera produces a composite of the two scenes. The method appears to be concerned exclusively with the concept of producing composite pictures by combining previously-produced pictures; the method does not appear to involve taking composite pictures of live persons or live scenes.

The present invention is concerned with the production of a composite photograph, using external mask elements aligned with the camera lens so that different areas of the lens is covered (or masked) during different exposures of the film negative. The mask elements are complementary so that after a double exposure of the film the composite photograph includes two scenes blended together, without noticeable demarcation lines between the two scenes.

A major feature of the invention is that the mask elements are external, so that the mask elements can be changed or adjusted without opening the camera or taking the camera into a darkroom. Also, the mask elements are preferably rotatable on the camera surface, so that the operative mask element is capable of precise adjustments. The mask element can be adjusted or repositioned, with assurance that the two scenes being photographed will merge or blend together at the desired demarcation line.

The invention is preferably practiced with an instant camera, e.g. a camera marketed under the name Polaroid Land. Use of an instant camera enables invention to be practiced in photo studios or tourist stores, where people come to have their pictures taken in special costumes, in front of the famous landmark backgrounds, to achieve interesting special effects.

Further details of the invention will be apparent from the accompanying drawings and description of an illustrative apparatus that can be used to practice the invention.

THE DRAWINGS

DESCRIPTION OF A PREFERRED EMBODIMENT OF THE INVENTION

Figure 1:
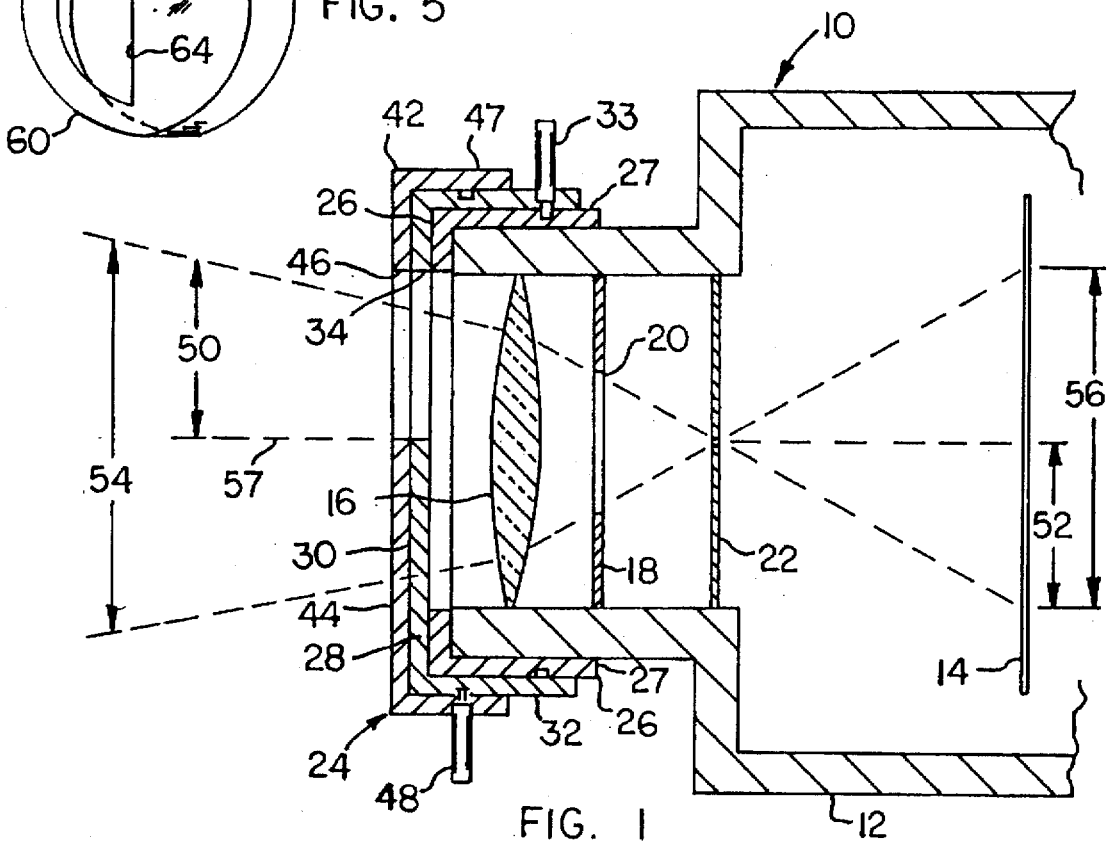
FIG. 1 is a fragramentary sectional view of a camera that can be used to practice the invention. The camera is equipped with an external mask structure that can be used to control the flow of light through the camera lens onto the film negative.

Referring particularly to FIG. 1, there is shown a conventional camera 10 that includes a camera housing 12 having internal mechanism for supporting a negative film strip 14. Only a portion of the film strip is shown in the drawing. The strip will be in rolled-up or folded condition so as to be movable to have different areas thereof in optical alignment with the camera lens 16 for film exposure purposes.

Preferably camera 10 is an instant camera having self-contained means for printing the exposed picture on a film positive. One suitable camera is the instant camera marketed under the name Polaroid Land camera. That camera uses packaged film in a box containing flat sheets of negative and positive film strips interposed so that images produced on the negative film can be printed on the film positive while the box is in place on the camera.

Printing the image on the film positive is accomplished by pulling the engaged film strips out of the box through steel rollers so that the two strips are in pressure contact with each other. A pod of chemicals attached to the film negative is broken to distribute the chemicals on the film surface, so that the chemicals are enabled to develop and fix (print) the picture on the film positive in a few seconds time.

The camera shown in FIG. 1 comprises the lens 16, light-control diaphragm 18 having an adjustable size opening 20, and a shutter 22. The size of opening (or aperture) 20 controls the size of the scene photographed for any given focus setting of lens 16; typically the lens can be moved toward or away from aperture 20 to adjust the focus. Lens 16 is, in practice, a lens system comprising multiple lens elements packaged together for adjustment purposes.

Shutter 22 is opened and closed to control the duration, or length of time, during which the light is permitted to pass through the lens onto film negative 14. In FIG. 1, the shutter is shown in the closed position. When the shutter is momentarily open it permits light rays to pass unobstructed from diaphragm aperture 20 onto film 14.

The invention is more particularly concerned with an external mask structure 24 mountable on the front end of camera 10 to cover (or mask) selected portions of lens 16. As shown in FIG. 1, the mask structure includes a mounting cap or ring 26 having a friction fit on the camera front end; cap 26 will, in most cases, have an annular cylindrical sleeve configuration so as to fit on the camera, without gaps or breaks between the cap and camera surfaces.

Rotatably positioned on cap 26 is a first mask element 28 having a flat front surface 30 and a cylindrical side surface (or flange) 32. Surface 32 is rotatably slidable on the cap 26 flange 27. Mask element 28 can be equipped with a small handle 33 to facilitate manual rotation of the mask element on-mounting cap 26. The front surface 30 of the mask element has a semi-circular opening 34 therethrough.

A second mask element 42 is rotatably mounted on mask element 28, such that each mask element is independently rotatable relative to the mounting cap 26. Mask element 42 includes a flat front wall 44 having a semi-circular opening 46 therethrough, and a cylindrical side surface or flange 47 rotatably slidable on the outer side surface of mask element 28. Mask element 42 is equipped with a turning handle 48.

As shown in FIG. 1, the two mask elements 28 and 42 have their respective front openings 34 and 46 aligned to permit entrance light rays having a width dimension 50 to be admitted to lens 16. The area of film negative 14 designated by numeral 52 is thereby exposed to the light rays.

In the absence of the mask structure 24, the entrance light admitted to lens 16 would have a width dimension 54; the corresponding area of film negative 14 exposed to the light rays rays is designated by numeral 56.

It can be seen that the presence of the external mask structure on the camera reduces the area of the film negative exposed to the light rays, so as to reduce the scene being photographed. As shown in FIG. 1, the mask structure 24 would cause the camera to photograph the scene above the midplane designated by numeral 57. For example, persons located to the left of the camera (in FIG. 1) could be photographed from the waist up (assuming midplane 57 is at waist level).

Handle elements 48 and 33 can be manipulated to adjust, or vary the positions of light-admission openings 46 and 34, to photograph different scenes (or portions of scenes). The scenes can be changed or altered between successive photographs to obtain various composite photographs.

Figure 2:
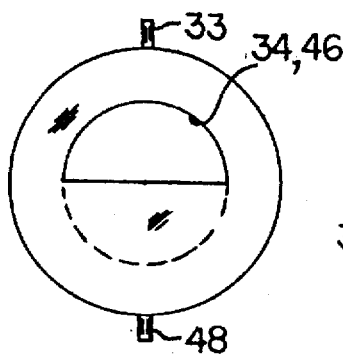
FIGS. 2, 3 and 4 are front views of the mask structure used on the FIG. 1 camera, but taken on a reduced scale. The mask structure is shown in different adjusted positions in the respective FIGS. 2, 3 and 4.
Figure 3:
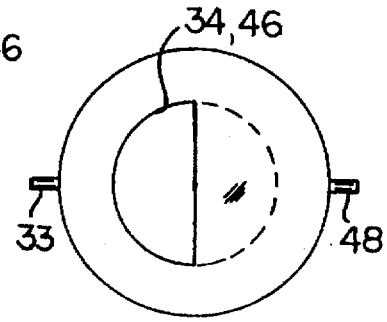

FIG. 2 is a front view of the mask structure 24, with the mask elements set in the adjusted positions depicted in FIG. 1. FIG. 3 shows the mask structure adjusted so that handle 33 is turned ninety degrees counterclockwise (down) and handle 48 is turned ninety degrees counterclockwise (up). The light-admission opening is thereby adjusted to admit light to the left half of lens 16. The two handles could be adjusted clockwise, to reposition the light-admission opening for admitting light to the right half of the lens 16. Similarly, the mask structures can be adjusted to restrict the entering light rays to the lower half of lens 16.

Figure 4:
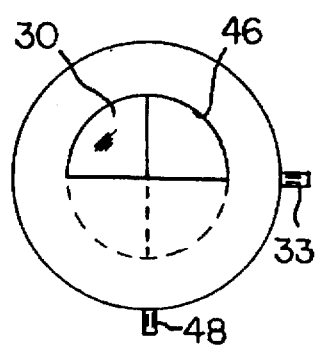

FIG. 4 shows handles 48 and 33 turned so that the mask structure admits light rays only to the upper right quadrant of the lens 16. It is thus possible to vary the size of the scene being photographed, and the location of the scene being photographed. Graduations may be provided on cap 26 and the flanges on the mask elements 28 and 42, to achieve precision adjustments of the mask elements.

The invention is practiced by adjusting the mask elements in one particular position, and then taking a first picture to form an image on the portion of film negative 14 in optical registry with the unmasked portion of the lens 16, e.g. the area designated by numeral 52 in FIG. 1. The mask elements 28 and 42 are then turned to different positions of adjustment so that different areas of lens 16 are masked (covered). The camera is operated (by opening shutter 22) to take a second picture in a different area of the film negative. The composite picture is printed on a single film positive to provide the final photograph.

Preferably the camera is an instant camera, such that the process can be carried out in small studios in tourist areas, or locations where different background scenery and foreground scenery can be stored and collected for selective usage.

The process permits a person, or object, to appear multiple times in a single photograph, e.g. in the left half of the photograph when the first picture is taken, and in the right half of the photograph when the second picture is taken. The camera lens can be adjusted between pictures, so that objects can be photographed at different distances from the camera, without being out of focus in either picture.

Figure 5:
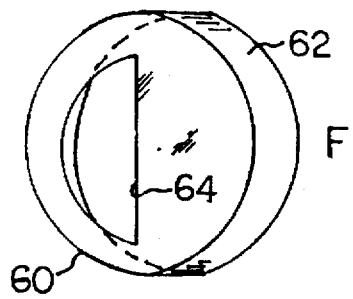
FIG. 5 is a perspective view of another mask structure that can be used in practice of the invention.

FIG. 5 shows an alternate mask structure that can be used in practice of the invention. The mask structure comprises a removable mask element 60 having a flange 62 adapted to have a friction fit on the front end of the camera housing. The illustrated mask element has a semi-circular opening 64 that admits light rays to a selected portion of the camera lens when the mask element is installed in a particular position of adjustment on the camera.

Between pictures, mask element 60 can be removed from the camera and installed in a different adjusted position, so that opening 64 admits light rays to a different portion of the camera lens.

It is possible to selectively use different mask elements having different size openings 64, e.g. a one quarter circle segment opening, or a one third circle segment opening, so as to vary the size of the picture being taken.

FIGS. 1 through 4 represent the preferred apparatus used in practice of the invention. Adjustments of the mask elements 28 and 42 can be relatively precise, especially if graduation markings are provided on the mask elements and mounting cap 26.

It will be appreciated that, while the drawings show specific apparatus useful in practice of the invention, some variations in apparatus and procedure can be used while still practicing the invention.

What is claimed is:

1. A method of producing a composite picture by photographing multiple scenes on predetermined areas of a photographic film comprising:

providing an annular circular mounting cap (26) on an external surface of a camera in concentric relation with the optical axis of the camera lens;

providing on said circular cap a first rotary circular mask (28), concentric around said optical axis, and having a semi-circular optical opening (34) and a first external radial handle (33);

providing on said first mask a second rotary circular mask (42), concentric around said optical axis, and having a semi-circular optical opening (46) and a second external radial handle (48);

manually turning said radial handles to individually rotate said first and second masks, so that the optical openings in said masks are in common overlapping alignment with a first portion of the camera lens;

actuating the camera to form an image on the portion of the photographic film in optical registry with the first portion of the camera lens; manually turning said radial handles to individually rotate said first and second masks, so that the optical openings in said masks are in common overlapping alignment with a second portion of the camera lens; and actuating the camera a second time to form an image on the portion of the photographic film in optical registry with the second portion of the camera lens.

* * * * *